(No Model.)
W. B. LANCASTER.
COFFEE COOKER.
No. 553,755.    Patented Jan. 28, 1896.
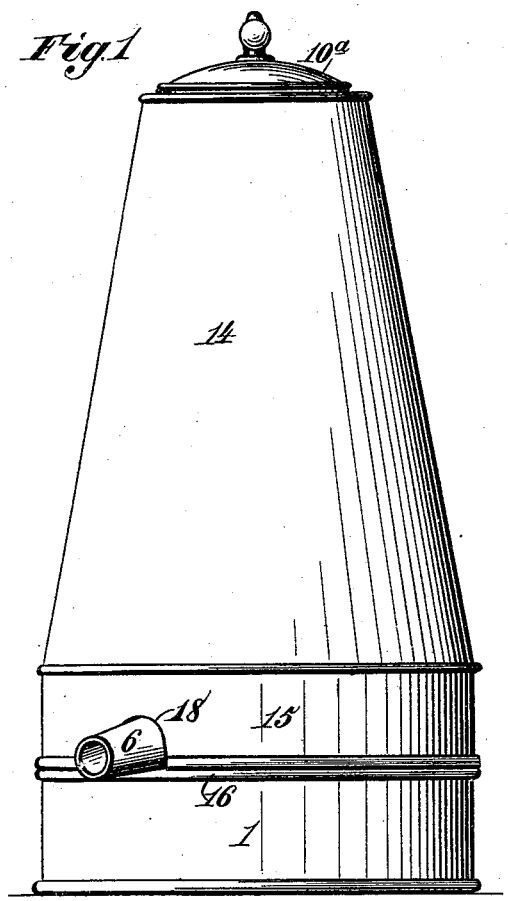
Fig. 1.
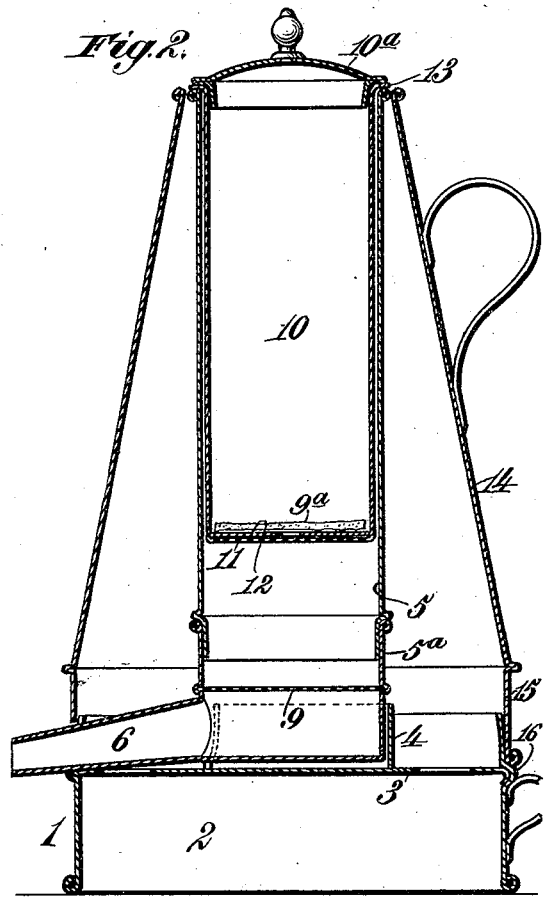
Fig. 2.
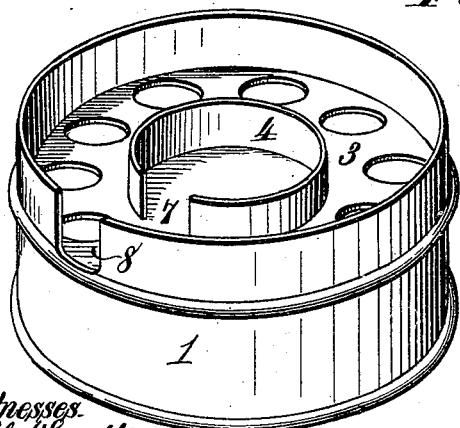
Fig. 3.
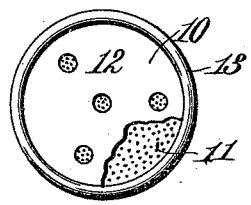
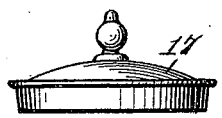
Witnesses.
Robert Errett
P. N. Tilden
Inventor:
William B. Lancaster
By Warren H. Coon
Atty.
ANDREW B. GRAHAM, PHOTO-LITHO, WASHINGTON, D.C.

UNITED STATES PATENT OFFICE.

WILLIAM B. LANCASTER, OF NEW ORLEANS, LOUISIANA.

COFFEE-COOKER.

SPECIFICATION forming part of Letters Patent No. 553,755, dated January 28, 1896.

Application filed October 29, 1895. Serial No. 567,319. (No model.)

*To all whom it may concern:*

Be it known that I, WILLIAM B. LANCASTER, a citizen of the United States, residing at New Orleans, in the parish of Orleans and State of Louisiana, have invented certain new and useful Improvements in Coffee-Cookers; and I do hereby declare that the following is a full, clear, and exact description of the same, reference being had to the annexed drawings, making a part of this specification, and to the figures of reference marked thereon.

This invention relates to coffee-cookers, and has for its object to provide an improved utensil for making coffee by percolation by means of which the boiling of the made coffee is avoided, the coffee as fast as it is made being conveyed off to another vessel, where it is subjected to a gentle heat until the entire operation is complete or until the time arrives for using the coffee.

To these ends my invention consists in the features and in the construction and arrangement of parts hereinafter described in the claims following the description, reference being had to the accompanying drawings, forming a part of this specification, wherein—

Figure 1 is a side elevation of my improved coffee-cooker. Fig. 2 is a vertical central section of the same, and Fig. 3 is a perspective view of some of the parts detached.

Referring to the drawings, the numeral 1 indicates the base of my improved coffee-cooker, consisting of a cylindrical body or shell 2, having secured between its upper and lower ends a grid or spider 3 provided with a central annular upwardly-projecting flange 4, forming a socket for the reception of the lower end of a cylinder 5. The cylinder 5 has fitted over its lower end a cylindrical bottom portion or can $5^a$, which is provided at its bottom with a discharge-spout 6, so that all the contents of said can will be drawn off through said spout. The said can fits within the annular flange 4, and the cylinder is thereby supported on the base in an upright position. Suitable apertures 7 and 8 are formed, respectively, in the flange 4 and the upper edge of the base 1 to permit of the passage of the spout 6. Arranged within the can $5^a$, just above the spout 6, is a foraminous diaphragm 9, upon which the ground coffee rests, and which operates as a strainer, as hereinafter described.

Adapted to rest within the cylinder 5 is a cylinder 10, of a slightly less diameter than the cylinder 5, so as to be easily inserted therein, said cylinder 10 being shorter than the cylinder 5, so that its lower end terminates at a point above the foraminous diaphragm 9, and said cylinder has secured in its lower end a foraminous diaphragm 11, immediately over which is secured a perforated disk 12, the perforations in said disk being small and few in number. The upper end of the cylinder 10 is provided with an outwardly-turned flange or bead 13, that is adapted to rest upon the upper edge of the cylinder 5 and serves both to suspend the cylinder 10 in the cylinder 5 and to prevent the escape of steam and vapor from the last-named cylinder. A cover $10^a$ is provided for closing the upper end of the cylinder 10.

A hood 14 is adapted to be fitted over the base 1 and inclose the parts above described. Said hood is preferably cone-shaped and is provided with a cylindrical bottom portion 15, very slightly larger than the upper edge of the base 1, over which it closely fits, said base being provided with a bead 16 upon which the lower edge of the bottom portion 15 of the hood rests. The upper contracted end of the hood 14 is open and may be provided with a removable lid or cover 17.

The operation of my improved coffee-cooker is as follows: A suitable quantity of ground coffee is placed in the cylinder 5 and the lower end $5^a$ of the cylinder is fitted in the annular flange 4 on the spider 5. The cylinder 10 is then inserted in the cylinder 5 and is filled, or partially filled, with boiling water and the cover $10^a$ placed on its upper end. Finally the hood 14 is placed over the whole and fitted upon the base 1, the lower cylindrical portion 15 being provided with a slot 18 to permit said hood passing over the spout 4. The entire device is placed upon a stove or other generator of heat, and a vessel of any suitable or preferred description is placed beneath or connected with the discharge end of the spout 4. Owing to the small number of perforations in the disk 12 in the lower end of the cylinder 10 the hot water will escape from said cylinder very slowly, and as it escapes it is broken up into innumerable small drops by the foraminous diaphragm 11 and drips down upon the coffee contained in the cylinder 5, through which it slowly percolates and passes through the foraminous diaphragm 9, by which it is strained, and is finally discharged through the spout 4 into the vessel provided for its reception. If it is desired to still further retard the escape of the water from the cylinder 10, a piece of textile fabric, as 9ª, such as flannel or the like, may be placed over the disk 12.

By making the base 1 of comparatively a large diameter and the hood cone-shaped a large heating-surface of the stove is covered, thereby collecting a correspondingly large volume of heat, and the cone-shaped hood will retain the heat and confine it in close proximity to the cylinders 5 and 10. The grid or spider 3 serves to maintain the cylinder 5 out of contact with the stove, and also serves to elevate said cylinder sufficiently to bring the spout at a convenient height to discharge the coffee into the vessel employed to receive the same.

By providing cylinder 5 with a removable bottom portion 5ª the operation of cleaning the cylinder is greatly facilitated.

By means of my improved device the coffee is conveyed away from the cooker to a suitable vessel the moment it is made, thus avoiding long-continued cooking of the coffee, which destroys its aroma and makes it bitter.

Having described my invention, what I claim is—

1. In a coffee-cooker, the combination with a base, of a cylinder adapted to be supported thereon and provided with a discharge-spout, a foraminous diaphragm arranged in said cylinder above said spout, an inner cylinder supported within said first-named cylinder and provided with a perforated bottom, a cover for said inner cylinder, and a hood for covering said base and cylinders, substantially as described.

2. In a coffee-cooker, the combination with a base, of a cylinder provided with a removable bottom portion adapted to be supported on said base and provided with a discharge-spout, a foraminous diaphragm arranged above said spout, an inner cylinder supported within said first-named cylinder and provided with a perforated bottom, a cover for said inner cylinder, and a hood for covering said base and cylinders, substantially as described.

3. In a coffee-cooker, the combination with a base, of a cylinder adapted to be supported thereon and provided with a discharge-spout, a foraminous diaphragm arranged in said cylinder above said spout, an inner cylinder supported within said first-named cylinder and provided with a perforated bottom, a textile fabric arranged upon said perforated bottom, a cover for said inner cylinder, and a hood for covering said base and cylinders, substantially as described.

4. The combination with a base 1 having a spider 3, of a cylinder 5 supported on said spider and provided at its lower end with a discharge-spout 6, a foraminous diaphragm 9 arranged within said cylinder above said spout, an inner cylinder 10 supported within said cylinder 5 and shorter than the latter cylinder, a perforated bottom arranged within the lower end of the cylinder 10, a cover for said last-named cylinder, and a cone-shaped hood 14 for covering said base and cylinders, substantially as described.

5. In a coffee-cooker, the combination with a base 1 having a spider 3 provided with an annular, upwardly-projecting flange 4, of a cylinder 5 seated within said flange and provided at its lower end with a discharge-spout 6, a foraminous diaphragm 9 arranged within said cylinder above said spout, a shorter cylinder 10 supported within the cylinder 5 above the diaphragm 9, a foraminous diaphragm 11 secured in the bottom of said inner cylinder, a perforated disk 12, secured immediately above the diaphragm 11, a cover for said cylinder 10, and a covered, conical hood fitted on said base over said cylinders, substantially as described and for the purpose specified.

6. In a coffee-cooker, the combination with a base 1 provided with a spider 3 having an annular, upwardly-projecting flange 4, of a cylinder 5 seated within said flange and provided at its lower end with a discharge-spout 6, a foraminous diaphragm 9 arranged within said cylinder above said spout, a shorter inner cylinder 10 supported within the cylinder 5 above the diaphragm 9, a perforated bottom secured in the lower end of the cylinder 10, a cover for said cylinder, and a covered conical hood 14 fitted on said base over said cylinders, the flange 6, base 1, and hood 14 being slotted as shown for the passage of the spout 6, substantially as described.

7. In a coffee-cooker, the combination with a base 1 provided with a spider 3 having an annular, upwardly-projecting flange 4, of a cylinder 5 seated within said flange and provided at its lower end with a discharge-spout 6, a foraminous diaphragm 9 arranged within said cylinder above said spout, a shorter inner cylinder 10 supported within the cylinder 5 by an outwardly-turned flange 13, a foraminous bottom 11 secured in the lower end of the cylinder 10, a perforated disk 12 secured immediately above said diaphragm, a cover for said inner cylinder, and a covered cone-shaped hood 14 having a cylindrical bottom portion 15 adapted to fit over the upper edge of the base 1, said base, annular flange and cylindrical portion 15 being slotted as shown for the passage of the spout 6, substantially as described.

In testimony whereof I have hereunto subscribed my name in the presence of two witnesses.

WILLIAM B. LANCASTER.

Witnesses:
R. E. L. C. RIES,
MALCOLM TAYLOR.